INVENTORS.
EUGENE A. OLIG
STEVEN E. KLABUNDE
BY
Wolfe, Hubbard, Voit & Osann
ATTORNEYS.

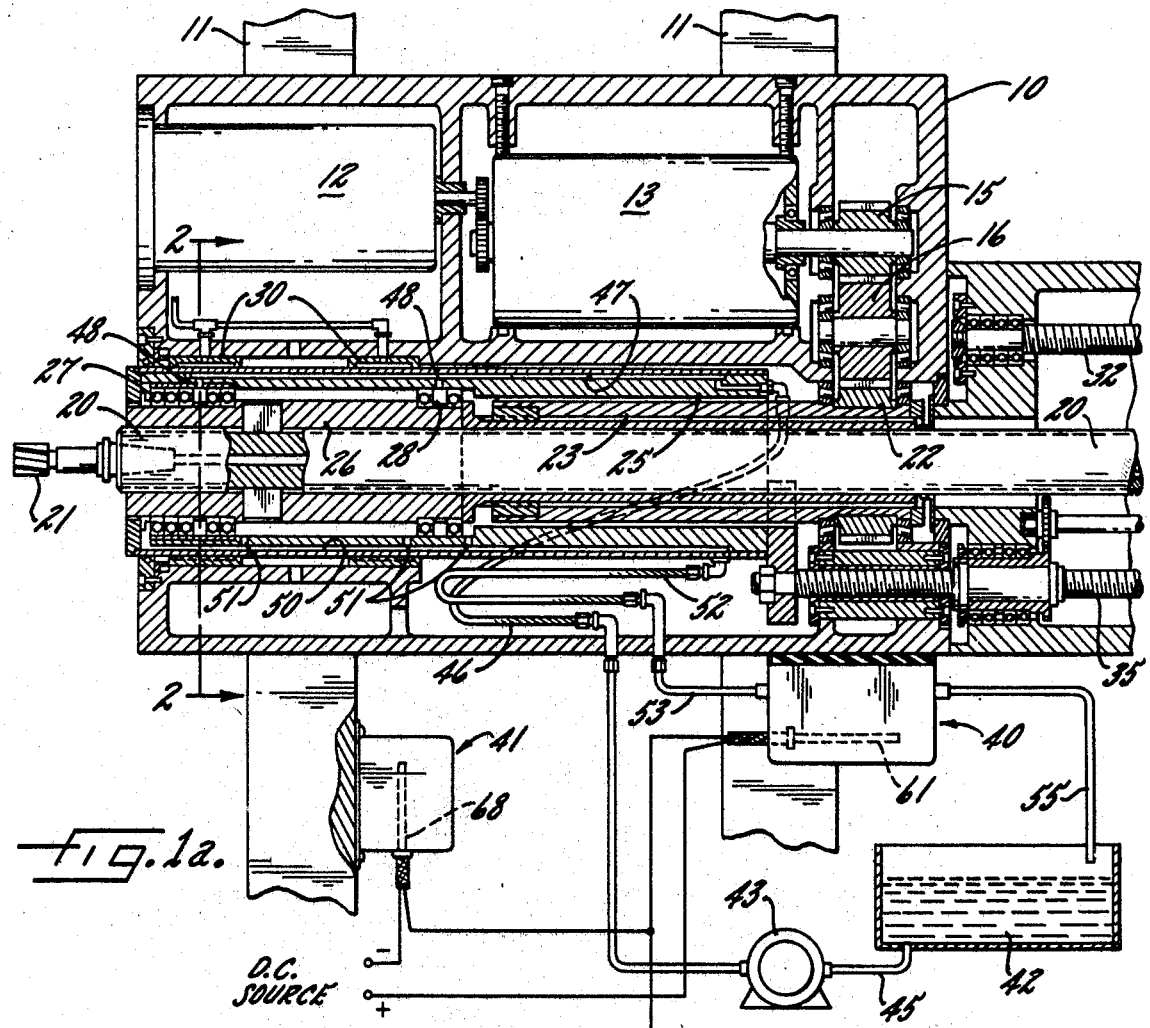
Fig. 1a.
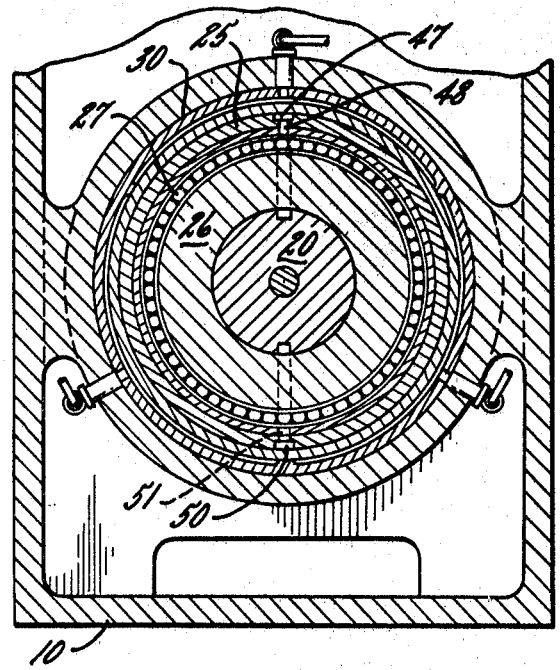
Fig. 2.
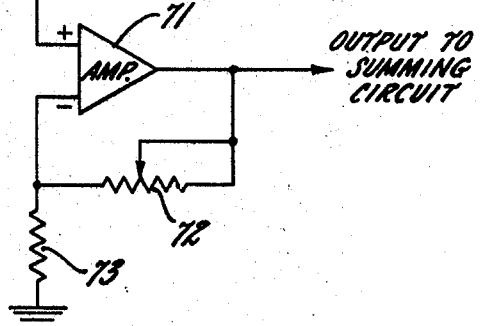
INVENTORS.
EUGENE A. OLIG
STEVEN E. KLABUNDE
BY
Wolfe, Hubbard, Voit & Osann
ATTORNEYS.

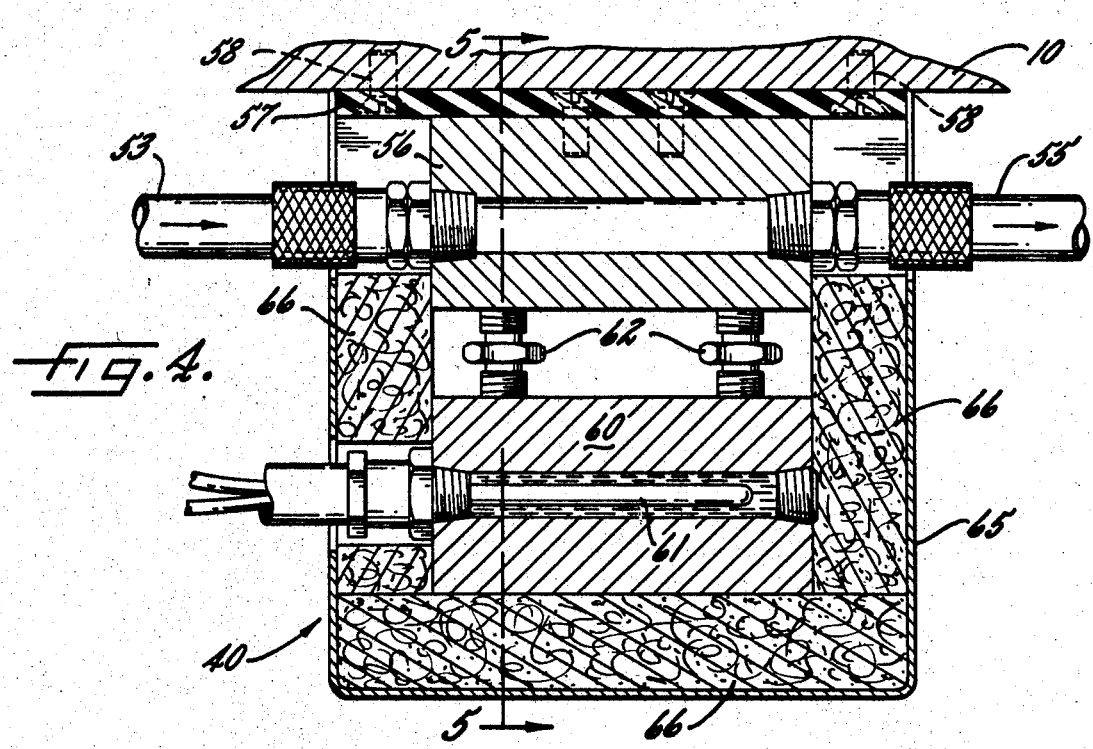
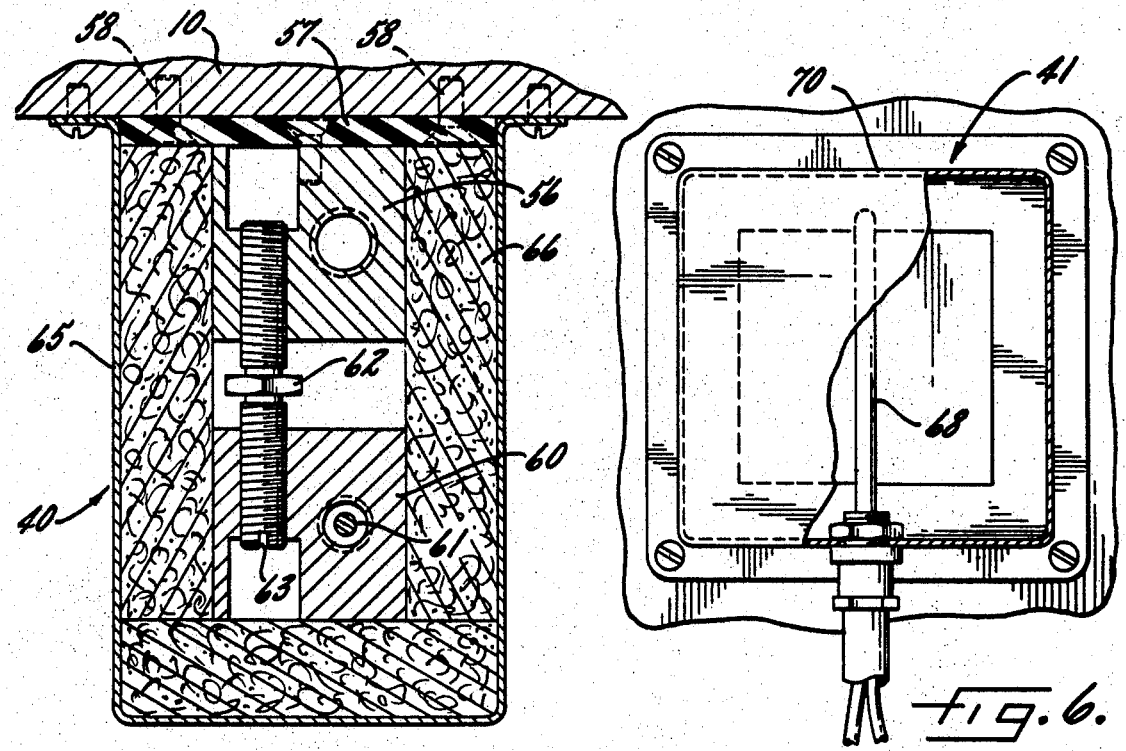

United States Patent Office 3,521,526
Patented July 21, 1970

3,521,526
METHOD AND APPARATUS FOR POSITIONAL CONTROL COMPENSATION FOR TEMPERATURE CHANGES IN MACHINE TOOL SPINDLES
Eugene A. Olig and Steven E. Klabunde, Fond du Lac, Wis., assignors to Giddings & Lewis, Inc., Fond du Lac, Wis., a corporation of Wisconsin
Filed Nov. 18, 1968, Ser. No. 776,406
Int. Cl. B23c 1/02
U.S. Cl. 90—14                                    5 Claims

ABSTRACT OF THE DISCLOSURE

A positional control compensation system and method of operation are disclosed in which a coolant is circulated between a reservoir and the bearings of a translatable machine tool spindle from which the returning fluid passes through a heat exchanger. The heat exchanger is separated from an insulated heat sink by a thermal delay path of adjustable length so that a thermistor in the heat sink senses a temperature which is at all times analogous to the actual internal spindle temperature. Circuit means is provided to generate a temperature-responsive error signal which applies the compensating positional correction to the spindle through a servomotor.

---

The present invention relates generally to machine tools, and in particular to numerically controlled machine tool systems in which the position of a translatable cutting head is controlled by a predetermined operational program. In its principal aspect the invention provides a control signal which is usable to correct the position of the cutting head in order to compensate for thermal expansion within the rotating machine elements.

Modern numerically controlled machine tools, such as the exemplary horizontal boring machine described herein, rely for their accuracy on accurate positional information regarding the location of a cutting head relative to an initial zero setup position. In effect, all dimensions are taken by the machine from this initial zero point so that any error due to thermal expansion of one or more of the machine elements will be reflected in corresponding errors in the work turned out by the machine. Since it is not possible to measure the position of the actual point of cutting relative to the initial zero point, all measuring must be done indirectly by sensing the position of one or more movable machine tool elements at a point removed from the actual cutting point, and any change in dimension between the point of actual measurement and the cutting point will result in error.

In operation, the temperature of a machine tool such as the present exemplary horizontal boring machine starts from what is for all practical purposes the ambient temperature of the workroom. During machining operations heat is then generated both at the cutting head by the removal of metal and within the machine tool by friction in such elements as gear trains, bearings, rotating seals, clutches, electric motors, and other moving parts of all descriptions. The temperatures of internal parts of the machine tool will thus rise as operation continues. Some heat will be dissipated by transfer to circulating lubricants within the machine, some by thermal conduction from the machine to its footings and surrounding equipment, and some by transfer to the air within the workroom, but a general overall increase in internal temperatures will occur. After stopping the machining operation this heat will gradually dissipate by ordinary conduction and convection until, after a suitably extended length of time, the machine returns to substantially the ambient temperature of the workroom.

Although some of the heat generated within the machine can be carried away and dissipated through the use of a recirculating coolant system, the problem of internal temperature changes is still a serious one. The rotating spindle of a heavy machine tool can increase considerably in temperature due to the friction of heavy multiple bearings required to carry the high side loads commonly encountered in machining operations. It has been found practical in the past to supply artificial cooling means to the outer or stationary races of the spindle bearings, and such a system is disclosed and described in detail in the pending U.S. patent application of McCann et al., Ser. No. 595,504, filed on Nov. 18, 1966 and now Pat. No. 3,469,496. However, the heat generated in the inner races of the spindle bearings is for the most part transferred directly to the rotating spindle itself where it is difficult or impossible to control by existing cooling means because of the rotation of this machine part.

In view of the foregoing, it is a principal object of the present invention to provide a method and apparatus for correcting the position of the cutting head of a rotating machine tool spindle in response to temperature changes within the spindle itself. It is intended that this method and apparatus be particularly applicable to numerically controlled automatic machine tools in which the rotating spindle is axially translatable and positioned by servomotor means in response to a control signal.

It is a further object to provide a recirculating coolant system for controlling the temperature of a rotating machine tool spindle in which the coolant returning from the spindle exchanges heat with a thermal delay heat sink which then serves as a continuous temperature analogue, indicative of internal spindle temperature. An electrical control signal is thereby generated so that an appropriate positional correction may then be applied.

A further object of the present invention is to provide a method and apparatus for performing the foregoing function in which no mechanical connection to the spindle itself is required, with the desired interaction being accomplished solely by means of a recirculating fluid system.

While the present invention is described in connection with a particular exemplary embodiment for purposes of illustration, it will be understood that the utility and applicability of the invention is not to be so limited but may on the contrary be applied to any manner of machine in which the positional accuracy of a rotating member is impaired because of thermal expansion within the member, and in which it is impossible or impractical to control such heating by use of cooling apparatus alone.

Other objects and advantages of the invention will become apparent upon reading the following detailed description and upon reference to the drawings, in which:

FIGS. 1a and 1b, taken together, are a partial side elevation in section of a horizontal boring machine incorporating apparatus exemplifying the present invention, with portions of the coolant recirculation system and electrical means being shown in schematic form;

FIG. 2 is a fragmentary section, somewhat enlarged, taken in the plane 2—2 of FIG. 1a;

FIG. 4 is an enlarged detail plan view illustrating the returning coolant temperature sensing means shown in FIG. 1a;

FIG. 5 is a section taken in the plane 4—4 of FIG. 3; and

FIG. 6 is a detail side elevation showing the ambient temperature sensing means illustrated in FIG. 1a.

Figure 3:
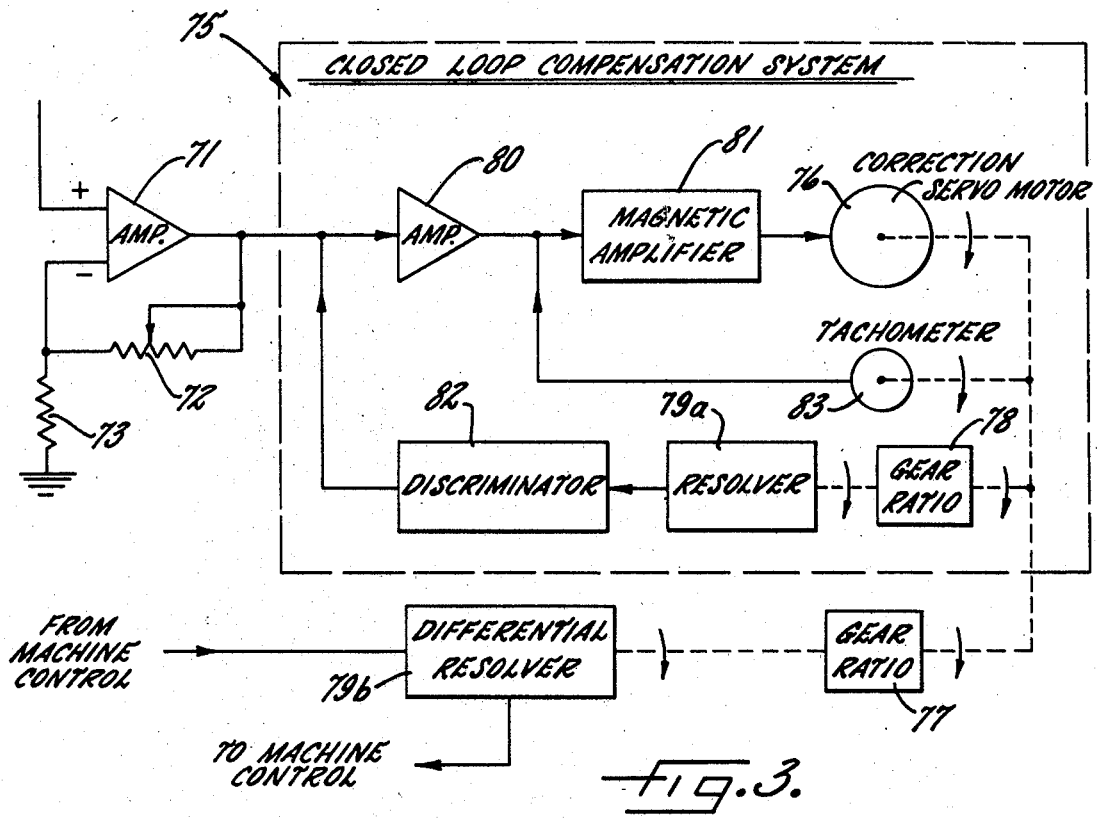
FIG. 3 is a schematic functional diagram of a representative machine tool servo-control system for use with the temperature sensing means of the present invention.
Figure 2B:
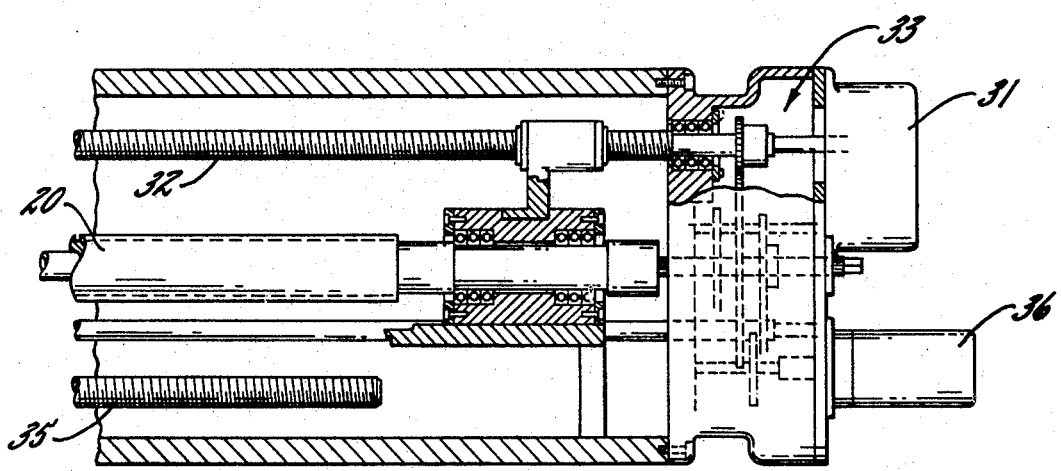

Turning first to the exemplary horizontal boring machine shown in FIGS. 1a and 1b, taken together, there is shown a headstock 10 which is carried for vertical movement on ways 11. Within the headstock 10 there is located a motor 12, a reduction gear case 13, and a pair of transfer gears 15, 16 which are used to transmit power from the motor 12 to a spindle 20 on which is mounted a cutting head 21. Power is taken from the gears 15, 16 by a spindle gear 22 mounted on a fixed sleeve 23 within the headstock 10.

The spindle 20 is axially translatable within a quill 25, as well as being separately movable with respect to the headstock 10, and for this purpose is splined to a translatable spindle sleeve 26 which is in turn splined to the fixed sleeve 23. It can thus be seen that power from the motor 12 is directed by way of the gears 15, 16 to the fixed sleeve 23, to the spindle sleeve 26, and then to the spindle 20 and thus to the cutting head 21. This permits the spindle 20 to be traversed in an axial direction independently of the quill 25, in synchronism with that member, or with any desired degree of proportion between the movements of these elements. This operation, as well as the detailed identification and description of the internal parts of this exemplary horizontal boring machine may be found in the previously mentioned McCann patent application, Ser. No. 595,504.

The rotating elements of the exemplary machine tool comprise the spindle 20 and the spindle sleeve 26, which are splined together as previously mentioned. The spindle sleeve 26 is carried for rotation within the quill 25 by two sets of antifriction bearings, these being a forward bearing assembly 27 comprising five individual ball bearing units, and a rear bearing assembly 28 comprising two ball bearing units. The greater bearing capacity is required near the cutting head 21 in order to resist the greater bearing pressures present at this point. The quill itself does not rotate and is supported for axial movement on hydrostatic bearings 30.

Axial positional movement of the quill 25 and spindle 20 is achieved through a system of sensors and servo-motors so that these elements may be moved separately or together in any desired degree of synchronism. For this purpose the exemplary machine tool of the illustrated embodiment uses a servomotor 31 driving a spindle feed screw 32 directly, and also driving, by means of a gear train 33 and a shaft 34, a quill feed screw 35.

A rotary feedback resolver 36 is incorporated into the gear train 33 to provide an electrical signal which is indicative of the number of revolutions applied to the spindle feed screw 32, thus providing positional information in the form of a feedback signal which is fed to the control system of the machine tool. It will be observed, however, that the information thus provided by the feedback resolver 36 is dependent for accuracy upon maintaining a constant length between the cutting head 21 and the point of attachment of the spindle 20 to the spindle feed screw 32. The generation and dissipation of internal heat from various sources including the cutting operation, the motor 12, the reduction gear case 13, the gear train including gears 15, 16 and 22 and bearings 27, 28 will cause temperature changes within the spindle 20 and the resulting thermal expansion and contraction will introduce errors into the automatic spindle position control system of the machine.

In order to compensate for such thermal dimensional changes, and according to the invention, a continuous electrical signal is generated which is indicative of the internal temperature of the spindle 20 and which is then applied as a correction signal to the positional control system of the machine tool. For this purpose means are provided by which a thermal analogue of the actual internal spindle temperature is created within a temperature sensing unit 40. Circuit means are then provided to sense the temperature difference between that of the analogue temperature and a reference temperature which, in the illustrative embodiment, is that of an ambient temperature sensing unit 41.

In accordance with the invention a fluid coolant recirculation system is provided including a reservoir 42, a pump 43, and an inlet line 45 including a flexible conduit 46 which feeds incoming coolant to a longitudinal inlet flow passage 47 in the quill 25. The passage 47 is located in the upper part of the quill 25 and serves to feed incoming coolant to the bearings 27, 28 through suitably located bores 48 interposed amid the bearing assemblies 27, 28. The flow of coolant thus passes over the bearings, particularly their inner races which are not susceptible to other means of cooling, and then flows down over the surface of the spindle 20 until it reaches the lower portion of the quill 25 and enters a return passage 50 through collection ports 51. From the return passage 50 the returning coolant is conducted through another flexible hose 52 and into a return line 53 which carries it to the sensing unit 40. After leaving the sensing unit 40, the coolant fluid flows through the discharge line 55 back to the reservoir 42.

The sensing unit 40 is best shown in FIGS. 4 and 5, in which it can be seen that the coolant return line 53 communicates with the discharge line 55 through a heat exchanger block 56. The efficiency of heat transfer through the block 56 may be enhanced if desired by providing a convoluted flow path, or by providing fins or other heat transfer means within the flow path of the returning coolant. The sensing unit 40 is preferably located as close to the spindle bearings 27, 28 as possible so that little heat will be lost from the coolant prior to entering the heat exchanger block 56. For this purpose the unit of the exemplary embodiment is located directly underneath the headstock 10. The heat exchanger block 56 is attached to an insulating plate 57 made of Formica or like material, and the plate 57 is in turn secured to the headstock 10. The fasteners used may be screws 58 as in the illustrated embodiment, or any other suitable means. The block 56 is preferably made of aluminum or other metal having a high heat transfer coefficient.

Further in accordance with the invention, there is located adjacent the heat exchanger block 56 a heat sink 60 also made of aluminum or other metal having a relatively high specific heat and other desired heat transfer characteristics. Within the heat sink 60 is provided a thermistor 61. The heat sink 60 is connected with a heat path to the heat exchanger block 56, but adjustably spaced therefrom, by a pair of threaded studs 62. As best shown in FIG. 5, and as a feature of the invention, the studs 62 are threaded oppositely at each end so that a screwdriver may be placed in a slot 63 and the heat sink 60 and heat exchanger 56 may be adjustably spaced to vary the heat transfer path by turning the studs 62 in one direction. The studs 62 thereby provide an adjustable heat transfer delay conduit which introduces a resistance to the flow of heat from the heat exchanger 56 to the heat sink 60 and causes temperature changes in the heat sink 60 to lag those of the heat exchanger 56, both in rising and falling temperatures of the heat exchanger block 56. The resultant effect is that the thermistor 61 senses an analogue of the actual internal temperature of the spindle 20, and the operation of the analogue may be adjusted by means of the adjustable studs 62 to perfect its operation.

The thermal delay feature of the present invention is important because experience has shown that the cooling oil issuing from the return line 53 will gradually rise in temperature during machine operation until it finally levels off, often an hour or more after the machine has been started up. It has also been found that even though the returning coolant from the return line 53 has reached a stabilized temperature, the internal temperature of the spindle 20 itself may not actually level off until long after this time, often on the order of another hour later. For this reason the time delay feature provided by the adjustable heat conduits in the form of the studs 62 enables the sensing unit 40 to provide a reliable temperature analogue of the spindle 20 itself.

Adjustments of the heat transfer or thermal delay path between the heat exchanger block 56 and the heat sink 60 are simply made by turning the threaded studs 62 as previously described until the desired characteristics of operation are obtained. Alternatively, the necessary spacing between the heat exchanger 56 and heat sink 60 may be calculated in units of B.t.u.'s per hour by means of the following equation:

$$\frac{dQ}{dt} = \frac{KA}{L}(T_1 - T_2)$$

In which:

Q=Heat
t=Time
K=Heat transfer coefficient
A=Effective cross-sectional area of the studs 62
L=Stud heat transfer length
M=Mass of the heat sink 60
$C_p$=Specific heat of the heat sink 60
$T_1$=Temperature of the heat exchanger 56
$T_2$=Temperature of the heat sink 60

The sensing unit 40 also includes a protective enclosure 65 and a layer of insulation 66 which reduces heat transfer from the heat exchanger 56 and heat sink 60 to the surrounding environment, and vice versa. The insulation 66 may be foam plastic, fiber glass wool, or any similar material.

For the purpose of supplying a reference signal representative of ambient or normal temperature, a second thermistor 68 is supplied in the ambient sensor unit 41 (FIG. 6) at a location suitably remote from the heat-generating regions of the machine tool. A protective housing 70 is provided for this unit to minimize the effects of random air currents.

Referring back to FIG. 1a, it can be seen how the thermistors 61 and 68 may be used in the control system of the machine tool. The thermistors 61 and 68 are connected in series across a source of D.C. voltage with their midpoint being connected to the positive input of an amplifier 71. This is generally referred to as a half-bridge configuration in which the amplifier 71 includes a gain control potentiometer 72 and a load resistor 73. Prior to start-up of the machine under normal conditions of operation both thermistors 61, 68 will be at the same normal or ambient temperature and therefore the voltage applied to the differential amplifier 71 will be zero. As the temperature of the spindle bearings 27, 28 increases, this temperature rise will be reflected in a rising temperature of the returning coolant in the sensing unit 40, and the half-bridge circuit will become unbalanced with a positive voltage appearing at the output of the amplifier 71. Naturally the actual temperature sensed by the thermistor 61 in the heat sink 60 will not be the same as that of the spindle 20, but this difference is easily compensated for by adjusting the gain of the amplifier 71 by means of the potentiometer 72. By proper adjustment of the latter element the correction output to the numerical control system can be scaled in proportion to the actual temperature difference and the spindle position correction which is required. Once calibrated, the system will provide a positional correction proportional to the actual thermal expansion of the spindle 20 at all times during the course of machine operation.

If the machine tool controlled by the system of the present invention is located in a temperature-controlled room so that the start-up temperature of the machine does not vary from day to day, then the second thermistor 68 is made unnecessary and it can be replaced by a simple resistance element (not shown). In this type of system it is desirable to perform the initial setup with the machine at a predetermined reference temperature so that an accurate correctional signal is thereafter produced for variations of temperature from the start-up conditions.

Another exemplary method of introducing the correction signal into a numerical or other type of automatic spindle positioning control system is illustrated in FIG. 3. In this case, a correction control loop 75 is driven by a correction servomotor 76 and applies the desired positional correction to a main machine control spindle feed position control loop (not shown). The proper amount of correction is determined by selection of the proper gears 77, 78 connecting the correction servomotor 76, a resolver 79a, and a differential resolver 79b. Correction is also achieved by proper adjustment of the resistance of the gain control potentiometer 72. The correction control loop 72 also includes a second electrical amplifier 80, a magnetic amplifier 81, and a discriminator 82 in the input to the amplifier 80. A tachometer 83 supplies input to the magnetic amplifier 81.

In machine tool positioning systems using digital inputs for a Z axis command number, the thermistors 61, 68 are excited with an A.C. voltage so that the output of the associated amplifier will vary in amplitude. The correction output A.C. voltage is then summed with a reference A.C. voltage 90° out of phase, so that the resulting signal will have a phase variation with temperature. This signal may be easily digitized in the control system and algebraically added to the Z axis command number.

Certain machine tool applications of the present invention may permit simplification of the sensing unit 40. Once the dimensions of the heat exchanger block 56, the thermal delay studs 62, and the heat sink 60 have been determined, either theoretically or experimentally, for a given type of machine tool, these elements can be combined if desired into a single monolithic block of predetermined dimensions in which the necessary characteristics of thermal delay and heat absorption are obtained without the use of several separate elements. The insulated enclosure 65 may also be omitted in cases where the surroundings of the unit are such that heat lost from its elements is negligible.

The following is claimed as invention:

1. In a machine tool having an axially translatable spindle supported for rotation in a headstock by spindle bearings, a temperature compensating axial position control system comprising, in combination, reference means for producing a first voltage representing ambient temperature, a reservoir of cooling fluid, circulating means for directing coolant from the reservoir to the spindle bearings and back to the reservoir, said circulating means including a supply line and a return line, a heat exchanger in heat transferring relation to coolant passing through the return line, sensing means for producing a temperature-indicating second voltage, a heat sink surrounding said sensing means, a heat transfer delay conduit interconnecting said heat exchanger and heat sink, an insulating enclosure encasing said heat sink and delay conduit, circuit means for combining said first and second voltages to provide an error signal, and servometer means for correcting the axial position of the spindle in response to said error signal.

2. Apparatus as defined in claim 1 in which the heat sink comprised a metallic block adjustably spaced from the heat exchanger means by a heat transfer conduit comprising a threaded stud.

3. Apparatus as defined in claim 2 having a second threaded stud interconnecting said heat exchanger means and heat sink, in which both studs are oppositely threaded at opposite ends with each end being received in a corresponding threaded socket in the heat exchanger means and heat sink, respectively, whereby the heat transfer path therebetween may be selectively adjusted by rotating the studs.

4. A method for correcting the axial position of a translatable spindle in a machine tool headstock in response to internal temperature changes, the spindle being supported for rotation in the headstock by spindle bearings, comprising the steps of circulating coolant from a reservoir to the spindle bearings and back to the reservoir through a heat exchanger, transferring heat between the coolant in the heat exchanger and a heat sink through a thermal delay conduit, sensing the temperature of the heat sink, comparing the heat sink temperature against a reference temperature and generating an error signal which is a function of the difference, and correcting the axial position of the spindle in response to the error signal.

5. In a machine tool having an axially translatable spindle supported for rotation in a headstock by spindle bearings, a temperature compensating axial position control system comprising, in combination, reference means for producing a first voltage representing ambient temperature, a reservoir of cooling fluid, circulating means for directing coolant from the reservoir to the spindle bearings and back to the reservoir, said circulating means including a supply line and a return line, a heat exchanger in heat transferring relation to coolant passing through the return line, sensing means for producing a temperature-indicating second voltage, a heat sink surrounding said sensing means, a heat transfer delay conduit interconnecting said heat exchanger and heat sink, circuit means for combining said first and second voltages to provide an error signal, and servomotor means for correcting the axial position of the spindle in response to said error signal.

References Cited

UNITED STATES PATENTS

| | | |
|---|---|---|
| 2,988,681 | 6/1961 | Bower. |
| 3,221,606 | 12/1965 | Baldwin. |
| 3,429,224 | 2/1969 | Osburn. |

GIL WEIDENFELD, Primary Examiner

U.S. Cl. X.R.

77—3; 82—30; 90—11